US009879758B2

(12) United States Patent
Spies et al.

(10) Patent No.: US 9,879,758 B2
(45) Date of Patent: Jan. 30, 2018

(54) POWER CONDUCTING DEVICE FOR LARGE ANGLES OF TWIST

(71) Applicant: Tsubaki Kabelschlepp GmbH, Wenden-Gerlingen (DE)

(72) Inventors: Jonathan Spies, Freudenberg (DE); Thomas Ameis, Siegen (DE); Uwe Kemper, Kreuztal (DE)

(73) Assignee: Tsubaki Kabelschlepp GmbH, Wenden-Gerlingen (DE)

( * ) Notice: Subject to any disclaimer, the term of this patent is extended or adjusted under 35 U.S.C. 154(b) by 720 days.

(21) Appl. No.: 14/377,414

(22) PCT Filed: Jan. 31, 2013

(86) PCT No.: PCT/EP2013/051856
§ 371 (c)(1),
(2) Date: Aug. 7, 2014

(87) PCT Pub. No.: WO2013/117478
PCT Pub. Date: Aug. 15, 2013

(65) Prior Publication Data
US 2015/0000243 A1    Jan. 1, 2015

(30) Foreign Application Priority Data
Feb. 8, 2012   (DE) .................... 20 2012 001 228 U

(51) Int. Cl.
*F16G 13/16*   (2006.01)
*H02G 11/00*   (2006.01)
*H02G 11/02*   (2006.01)

(52) U.S. Cl.
CPC ........... *F16G 13/16* (2013.01); *H02G 11/006* (2013.01); *H02G 11/02* (2013.01)

(58) Field of Classification Search
CPC ...... F16G 13/16; H02G 11/006; H02G 11/02; H02G 3/0475
(Continued)

(56) References Cited

U.S. PATENT DOCUMENTS 3,282,044 A * 11/1966 Maisey ................. B65H 75/38
254/372
4,807,432 A * 2/1989 Mauri ................. H02G 11/006
248/49

(Continued)

FOREIGN PATENT DOCUMENTS

DE    2747126 A1    4/1979
DE    3214257 A1    12/1982
(Continued)

*Primary Examiner* — David B Jones
(74) *Attorney, Agent, or Firm* — BainwoodHuang

(57) ABSTRACT

The power conducting device includes at least one first and one second line guiding device. The power conducting device has a first guiding channel and a second guiding channel which can be twisted about a common axis. The first line guiding device is arranged in the first guiding channel and the second line guiding device is arranged in the second guiding channel. The line guiding devices in each case have an end member and a connecting member, the end member being connected either to a respective inner ring or outer ring, and the connecting member being connected to the respectively other outer ring or inner ring.

17 Claims, 7 Drawing Sheets

Figure 1:
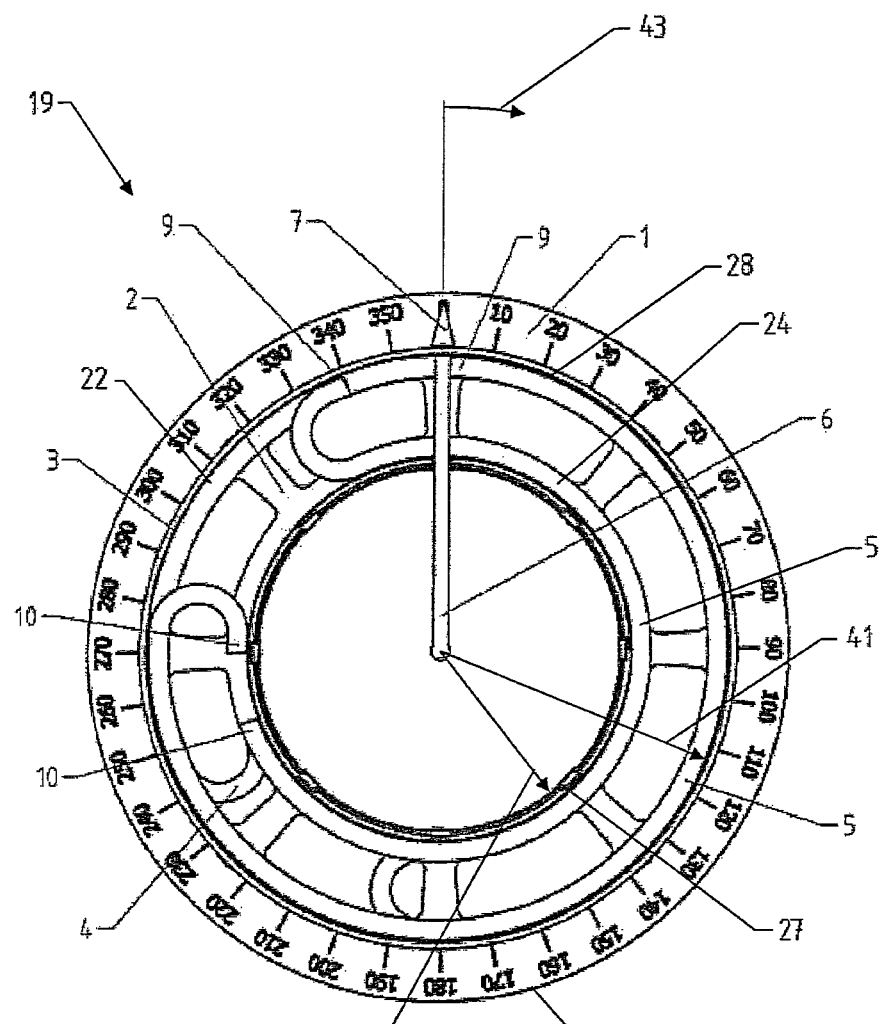

(58) Field of Classification Search
USPC .......................................................... 59/78.1
See application file for complete search history.

(56) References Cited

U.S. PATENT DOCUMENTS

| | | | |
|---|---|---|---|
| 9,325,159 B2* | 4/2016 | Spies | H02G 11/006 |
| 2014/0090350 A1* | 4/2014 | Spies | H02G 11/006 |
| | | | 59/78.1 |
| 2015/0000243 A1* | 1/2015 | Spies | F16G 13/16 |
| | | | 59/78.1 |

FOREIGN PATENT DOCUMENTS

| | | | |
|---|---|---|---|
| DE | 4005594 A1 | | 8/1991 |
| DE | 202005001651 | * | 7/2006 |
| DE | 102007038567 A1 | | 2/2009 |
| DE | 202011103263 U1 | | 9/2011 |
| DE | 202011004776 U1 | | 7/2012 |
| EP | 0443600 A1 | | 8/1991 |
| FR | 2506088 A1 | | 11/1982 |

\* cited by examiner

POWER CONDUCTING DEVICE FOR LARGE ANGLES OF TWIST

The subject matter of the invention relates to a power conducting device comprising at least one first line guiding device and a first guiding channel, in which the first line guiding device is arranged. Furthermore, it relates to a roller carriage for receiving a line guiding device.

Line guiding devices are known for guiding lines, hoses or the like between a stationary and a movable connecting point. Line guiding devices of this type are also called power conducting units or power conducting chains. The line guiding devices are used in various apparatuses, machines and devices, in particular where it is necessary to transport consumables, power or the like by means of lines, hoses or the like from a stationary connection to a movable connection of a consumer. The line guiding device can be single-run or multiple-run.

The line guiding device has an end member and a connecting member. A deflectable section is connected between the end member and the connecting member and is connected to the latter. The section can be formed by chain links which form a channel for receiving lines, hoses or the like. A chain link can have two plates which are arranged substantially parallel to one another and are connected to one another by at least one transverse web.

Line guiding devices are arranged in such a way that they have a lower run, a curvature section and an upper run. Arrangements are also known, in which the line guiding device is rotated by 90°. If a rotated line guiding device of this type is equipped with a curvature radius and a reverse curvature radius, the line guiding device can be moved in two arcuate directions. In an arrangement with a lower run and an upper run, they can likewise be rotated in the arcuate direction about a vertical axis if a lateral curvature of the runs is additionally possible. In particular, it is known in arrangements of this type that the line guiding device is arranged in a guiding channel.

The end member is usually connected or fastened to an inner ring. The connecting member is fastened to the outer ring of the guiding channel. One of the two rings is rotatable and forms a driver connection with the end member or the connecting member.

By way of rotation of the ring, the line guiding device is deposited on the inner circumference of the outer ring or on the outer circumference of the inner ring. Different angles of twist can be realized as a result.

Embodiments are also known, in which two line guiding devices are arranged so as to run in opposite directions, as a result of which greater angles of twist can be realized. As an alternative, shorter line guiding devices can be used with a constant angle of twist which can be realized.

In order to increase the angle of twist which can be achieved, a further stage can be provided with a second guiding channel with a second line guiding device, which further stage corresponds substantially to the first stage with the first guiding channel with the first line guiding device. If, for example, the second guiding channel with the second line guiding device is identical to the arrangement with the first guiding channel and the first line guiding device, the angle of twist can be doubled by way of the use of the second stage with respect to the first guiding channel. The angle of twist is correspondingly multiplied by the number of stages in the case of each further stage.

However, it has proven disadvantageous in the case of power conducting devices having a plurality of stages that, during twisting of the power conducting device, the stage which is driven first of all is initially twisted completely and then a further stage is twisted completely, optionally by means of a stop. In a uniform rotational movement, this also leads to the further stages being accelerated suddenly and to it being possible for the line guiding devices to be loaded excessively by way of the jolt which is produced.

Proceeding from this, the present invention is based on the aim of providing a power conducting device which minimizes the acceleration loading on the line guiding devices.

According to the invention, these objects are achieved by way of a power conducting device having features disclosed herein and a roller carriage having the features disclosed herein as well. Advantageous developments and refinements of the power conducting device according to the invention are subject matter disclosed herein.

The power conducting device according to the invention comprises at least one first line guiding device for guiding lines, hoses or the like. Furthermore, the power conducting device comprises a first guiding channel between a stationary connecting point and a movable connecting point. Moreover, the power conducting device comprises at least one second guiding channel, the first line guiding device having a first end member, a first connecting member and a section which is connected between the first end member and the first connecting member and is connected to them, which together form a channel for receiving lines, hoses or the like. Here, the adjacent first and second connecting members or first and second end members are connected to one another.

Here, the guiding channel can form various closed shapes in the movement direction, such as an oval or another closed free form. The guiding channel is preferably circular. Here, the inner ring and the outer ring correspond in such a way that the cross section of a guiding channel is substantially constant. For the sake of simplicity, the term rotation or twisting is used in the following text for a movement of a ring. Here, the ring can be composed of a closed ring element or can be composed of a plurality of different movement elements which, for example, can be moved relative to one another, and, in particular, are connected to one another only via the line guiding device.

A first guiding channel and at least one second guiding channel are arranged in the proposed power conducting device. At least one first line guiding device is arranged in the first guiding channel and at least one second line guiding device is arranged in the second guiding channel. The line guiding devices have an end member and a connecting member, the end member being connected either to the respective inner ring or outer ring and the connecting member being connected to the respectively other outer ring or inner ring. Between the end member and the connecting member, a section which is connected to them is provided, with the result that a channel is formed for receiving lines, hoses or the like. The first and the second guiding channel can be twisted relative to one another about a common axis. Either the connecting members of the first and second line guiding device are connected to one another or the end members of the first and second line guiding device are connected to one another. The speed from the connecting member to the end member is doubled or halved by way of the curvature section between the lower run and the upper run of the line guiding devices.

The speed is therefore halved or doubled again by way of the fixed connection of the two connecting members or of the two end members of the adjacent guiding channels. In other words, the speed is distributed uniformly to the participating guiding channels. The entire power conducting device is therefore twisted by way of driving of a single connecting member or end member, with the result that all the guiding channels and all the line guiding devices are set in motion. It is avoided as a result that a line guiding device is accelerated in a sudden manner, whereas uniform twisting takes place on the drive side, for example via a driver arm. As a result, the line guiding device can have smaller dimensions and the overall construction of the power conducting device becomes smaller.

According to one advantageous refinement of the power conducting device, it is proposed that the outer ring or the inner ring of the first guiding channel is stationary. The first guiding channel can therefore be connected to a corresponding mounting frame on the bottom or the like. At the same time, the first connecting member or the first end member can be connected fixedly to the adjacent second connecting member or second end member in a rotatable manner. The first guiding channel can therefore already participate in the rotational movement despite the stationary arrangement of the outer ring or inner ring.

According to a further advantageous refinement of the power conducting device, the guiding channels are arranged above one another. This achieves a space-saving arrangement which is formed in a relatively narrow band between the respective outer rings and the inner rings. In the case of an arrangement above one another, the first and the second guiding channel are preferably congruent in terms of their dimensions of the inner rings and outer rings.

According to a further advantageous refinement of the power conducting device, two adjacent inner rings or two adjacent outer rings form a first wall of a first roller carriage and, furthermore, the first roller carriage has a first bottom, on which a first roller is arranged opposite the first wall. This arrangement achieves a situation where the adjacent connecting members or end members are connected fixedly to one another in a manner which is guided by a first roller carriage and thus move with a constantly identical speed. At the same time, the opposite end members or connecting members can be moved at a different speed. The latter are preferably moved at half or double the speed. Here, the bottom of the roller carriage forms a connection to the opposite side, on which a first roller is provided. A relative movement between the connecting members or end members which are not connected fixedly is possible by way of said roller.

In a further advantageous refinement of the power conducting device, an adjacent second roller carriage has a second bottom and a second wall which lies opposite the first wall of the first roller carriage, the two adjacent roller carriages enclosing a guiding channel. This arrangement makes it possible that a guiding channel is formed in each stage, in which the end members and connecting members are moved at different speeds and ultimately lead to all line devices of the power conducting device being moved at the same time.

In a further advantageous refinement of the power conducting device, the first guiding channel has a stationary guide, a stationary bottom and a stationary wall, the stationary wall forming a support for the first roller. This arrangement makes it possible for the first roller carriage to roll on the stationary wall of the first guiding channel. Moreover, a low-friction course of the twisting within the guiding channel and to the adjacent guiding channel is achieved.

According to a further advantageous refinement of the power conducting device, three guiding channels are provided which are arranged above one another and in which in each case at least one line guiding device is arranged. The arrangement of at least three guiding channels which are arranged above one another achieves a very large angle of twist. In particular, the advantage of the power conducting device according to the invention over sudden driving by means of a power conducting device according to the prior art becomes significant at the latest in the case of three or more guiding channels which are arranged above one another; this is because considerably more stable and therefore larger and heavier line guiding devices have to be used in the prior art than is necessary by way of the solution according to the invention.

In a further advantageous refinement of the power conducting device, the first wall of the first roller carriage has a third roller toward the stationary guide, which third roller rolls on the stationary guide, and a second roller is arranged between a roller carriage which is arranged on it and the first roller carriage. The arrangement of the rollers makes it possible for the roller carriages to roll on one another in a low-friction manner. In particular, low-friction relative movements between the inner rings and the outer rings can be brought about via said rollers.

In a further advantageous refinement of the power conducting device, the second roller is arranged on the second roller carriage. As a result of this integral construction, the power conducting device becomes very compact.

According to a further advantageous refinement of the power conducting device, a guiding channel forms a bottom and a wall which is connected to the bottom, and a roller is arranged on the bottom opposite the wall, the roller rolling on a wall which is arranged underneath and a wall which is arranged above rolling on the first roller. If, for example, the wall which is arranged above is driven and rolls on the first roller, said roller rolls on the wall which is arranged underneath. As a result of the fastening of the roller to the bottom of the guiding channel, the wall of the guiding channel is likewise driven. The movement travel is therefore transmitted in each case in a halved manner to the next stage or the next guiding channel in a manner which is transmitted by way of the roller. For example, in the case of an arrangement having three guiding channels one above another, the connecting member or end member is driven which is fastened to a wall which rolls on a roller. Said roller is fastened to a bottom which in turn is fastened on the opposite side to a wall. The end member or connecting member of the driven guiding channel is connected on said wall and is connected to the end member or connecting member of the guiding channel which lies underneath. By way of the rolling of the driven wall, the opposite wall is also driven and in turn rolls on a further wall which is arranged under the driven wall. The opposite wall with the two end members or connecting members rolls on a stationary wall, a roller once again being arranged in between which is connected to a bottom which is arranged on the further wall below the driven wall and below a roller. As a result of these operative connections, the speed or the distance to be covered is halved in each case from the driven wall to the opposite wall and in turn to the further wall which is arranged underneath, with the result that the driven connecting member or end member describes three times the speed of the lowermost connecting member or end member or covers three times the distance in the same time.

The relative movement between the connecting member and the end member of a respective guiding channel is identical. The described roller arrangement achieves a situation not only where all the line guiding devices in all guiding channels (in the case of uniform drive) are driven uniformly without sudden acceleration, but rather also where the transmission of force from one stage to the next stage does not take place via the line guiding devices, but rather is achieved completely via the rollers, bottoms and walls.

In a further advantageous refinement of the power conducting device, the radius of the inner rings and/or the radius of the outer rings of the different guiding channels are in each case identical. As a result of the identical radii or the congruent inner rings and outer rings, the transmission of the force in each of the guiding channels becomes identical. As a result, satisfactory transmission of the rotational movement from one guiding channel to the next guiding channel is achieved. A step-up transmission gear mechanism can be dispensed with in an arrangement of this type. In this embodiment, however, the inertia and frictional conditions of the guiding channels have to be adapted to one another.

In a further advantageous refinement of the power conducting device, the guiding channels are arranged next to one another, and the first outer ring of the first guiding channel and the second inner ring of the second guiding channel are formed by a common wall. As a result of an arrangement of the guiding channels next to one another, a particularly flat arrangement is achieved which has to correspond merely approximately to the height of the line guiding devices which are used. By virtue of the fact that a respective outer ring at the same time forms the inner ring of the adjacent guiding channel, the movement of one line guiding device can be transmitted by way of the end members or connecting members to the line guiding device which is arranged next to it. In particular, a transmission of movement by way of other, separate aids, such as gearwheels and toothed racks or roller chain and chain sprocket, is possible which achieves a uniform distribution of the movement of the guiding channels or the line guiding devices.

According to a further advantageous refinement of the power conducting device, rollers are provided between the guiding channels, and at least one of the rollers forms a speed step-up transmission means for adjoining guiding channels. In the arrangement above one another, the transmission of the movement from one guiding channel to the next guiding channel is made possible by way of the arrangement of a roller between two walls and the fastening to a bottom of a rolling carriage. However, rollers can also be formed in the manner of a gear mechanism between the adjoining guiding channels. In the arrangement next to one another, the rollers can be fastened, for example, to a wall, that is to say an inner ring and outer ring of adjacent guiding channels, and can extend from the inner ring of the inner guiding channel to the outer ring of the outer guiding channel and thus bring about halving or doubling of the speed transmission ratio.

In a further advantageous refinement of the power conducting device, in each case one intermediate carriage is provided in a guiding channel, which intermediate carriage acts on the section of the respective line guiding device, and to which intermediate carriage in each case at least one roller is fastened which rolls on the respective inner ring and the respective outer ring. The intermediate carriage acts, for example, on the line guiding device in such a way that the section between the end member and the connecting member is pressed by way of a rounded end of the intermediate carriage, which rounded end corresponds to the desired bending radius of the line guiding device. In this way, it becomes possible to move the end member at a different speed than the connecting member; in particular, the speed is halved. At least one of the intermediate carriages is advantageously provided with at least one roller which extends from the inner ring to the outer ring of the respective guiding channel. Therefore, for example, a movement of the inner ring is converted into a forward drive of the intermediate carriage and, furthermore, a forward drive of the outer ring. A respective inner ring thus moves in this example at twice the speed as the respective outer ring. Moreover, a uniform distribution of speed via the power conducting device is possible.

In a further advantageous refinement of the power conducting device, the line guiding device can be bent in each case only in one plane. For example, by way of an arrangement of the upper run and lower run of the line guiding device which is rotated by 90°, with the result that the run halves are arranged in one plane laterally with respect to the bent section, the line guiding device merely has to be capable of being curved or bent in the direction of the bendable section and to be capable of being bent in the opposite direction along the inner ring. As a result, the use of a simply constructed line guiding device becomes possible. In particular, lateral bending of the line guiding device (laterally with respect to the arrangement with upper and lower run) is avoided, for which purpose complicated joints have to be used as a rule.

In another advantageous refinement of the power conducting device, a connecting member and an end member are arranged in at least one of the guiding channels above one another. That is to say, the upper run is arranged in the field of gravity above the lower run. An arrangement of this type requires the line guiding device to be capable of being bent not only in the bending plane between the lower run and the upper run, but also in the plane of the angle of twist. However, this arrangement makes it possible to configure the entire power conducting device or parts of the power conducting device to be very narrow. Here, the guiding channels are merely as wide as the width of the line guiding device.

In a further advantageous refinement of the power conducting device, the inner ring and the outer ring of a guiding channel form side walls, and the end members and the connecting members are arranged on the side walls. This arrangement makes a particularly simple construction possible, in which the spacing between the outer ring and the inner ring merely has to be so great that the curvature section of the line guiding device is given sufficient space. Moreover, the guiding channels can be of very flat design because they merely have to have a height in accordance with the width of the line guiding device. Here, the width means the extent of the line guiding device parallel to the axis of the bend of the line guiding device.

In a further aspect of the invention, a roller carriage is also proposed which is suitable for receiving at least one line guiding device and has at least one bottom, a wall which laterally extends perpendicularly on both sides of the bottom, and a first roller which is arranged laterally on the bottom opposite the wall. A roller carriage of this type is particularly suitable for assisting the transmission of speed of two adjoining guiding channels. The transmission of a movement of one of the two walls which lie opposite one another is achieved, in particular, by way of the first roller which can be arranged between two walls which lie opposite one another and are adjacent, with the result that the line guiding devices in the adjacent guiding channels cover half the distance in the same time as the driven wall which lies opposite. In particular, the roller carriage is suitable for the use of a power conducting device according to the above description.

In a further aspect of the invention, an intermediate carriage is also described for arranging in a guiding channel for acting on a section of a line guiding device, which intermediate carriage has at least one roller which extends from an inner ring to an outer ring of the guiding channel, and the intermediate carriage can be driven by the inner ring and/or outer ring. The intermediate carriage is preferably set up to act on the section of a line guiding device between the end member and the connecting member precisely in the region where the section is bent. For this purpose, the intermediate carriage has a rounded end which corresponds to the desired bending radius of the section. By way of the intermediate carriage, the line guiding device is moved in the respective guiding channel or is at least brought into contact with the respective inner ring and outer ring.

Furthermore, it is advantageous to fasten at least one roller to the intermediate carriage, which roller extends from the respective inner ring to the respective outer ring of the relevant guiding channel and can roll thereon. Here, the roller can also be configured as a gearwheel, and the corresponding inner ring and outer ring can in each case form a toothed rack. This arrangement makes it possible to transmit the speeds in a halved or doubled manner from an end member to a connecting member, or vice versa, of a guiding channel. In particular, a drive speed is distributed uniformly to the guiding channels in the case of the use of at least one roller per guiding channel, with the result that the relative speed between the respective end member and connecting member is identical in every guiding channel. This principle can generally be achieved by way of each of the refinements of the invention which are described above and below.

The features which are described individually herein can be combined with one another in any desired, technologically appropriate way and can be supplemented by explanatory facts from the description and details from the figures, further design variants of the invention being indicated.

Figure 2:
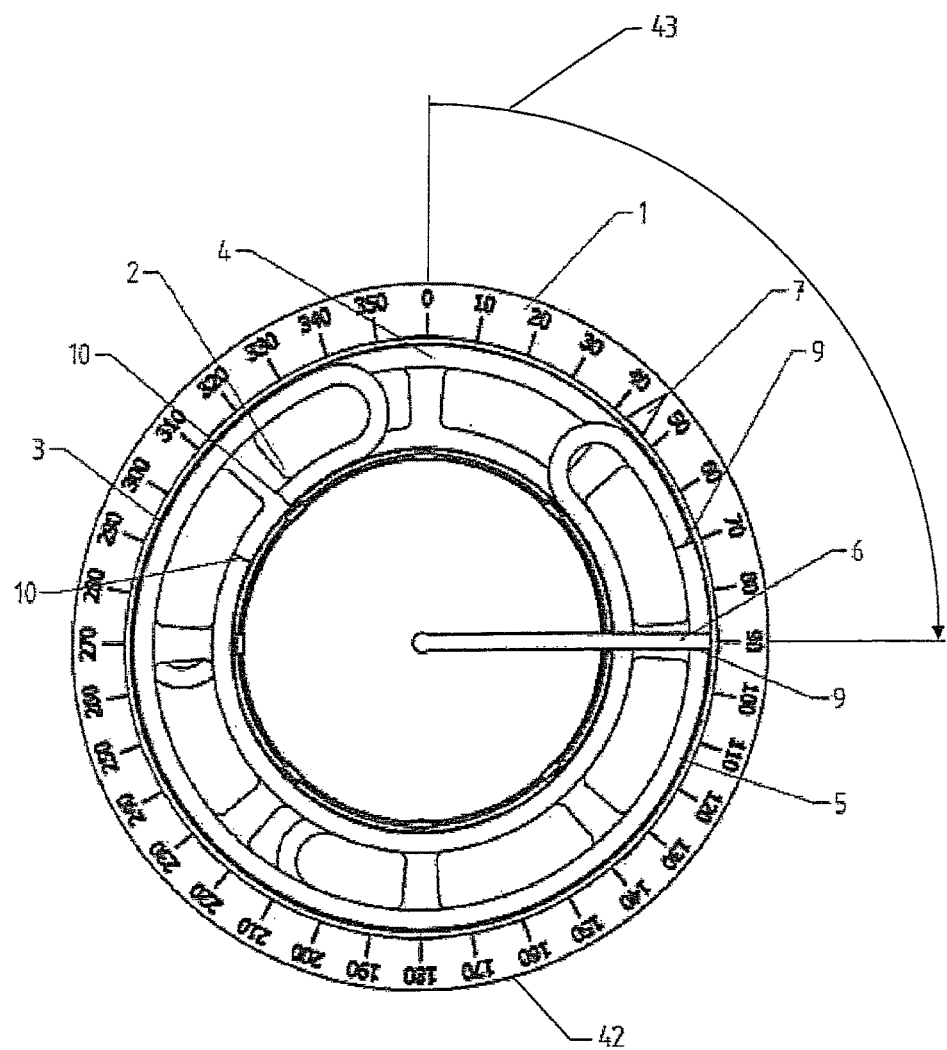
Figure 3:
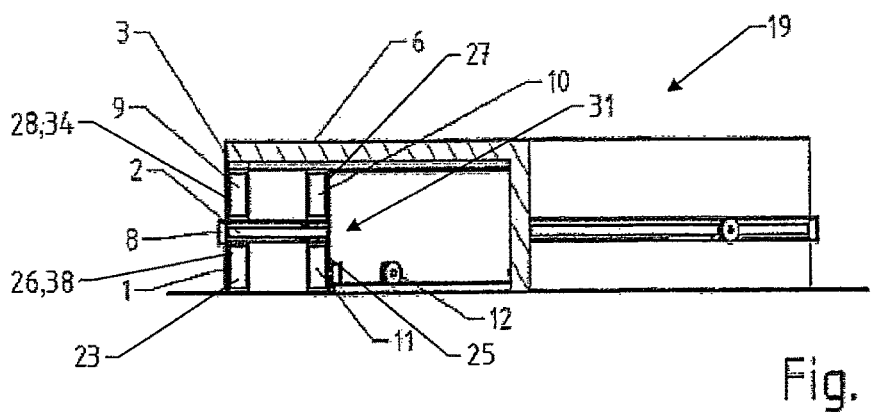
Figure 4:
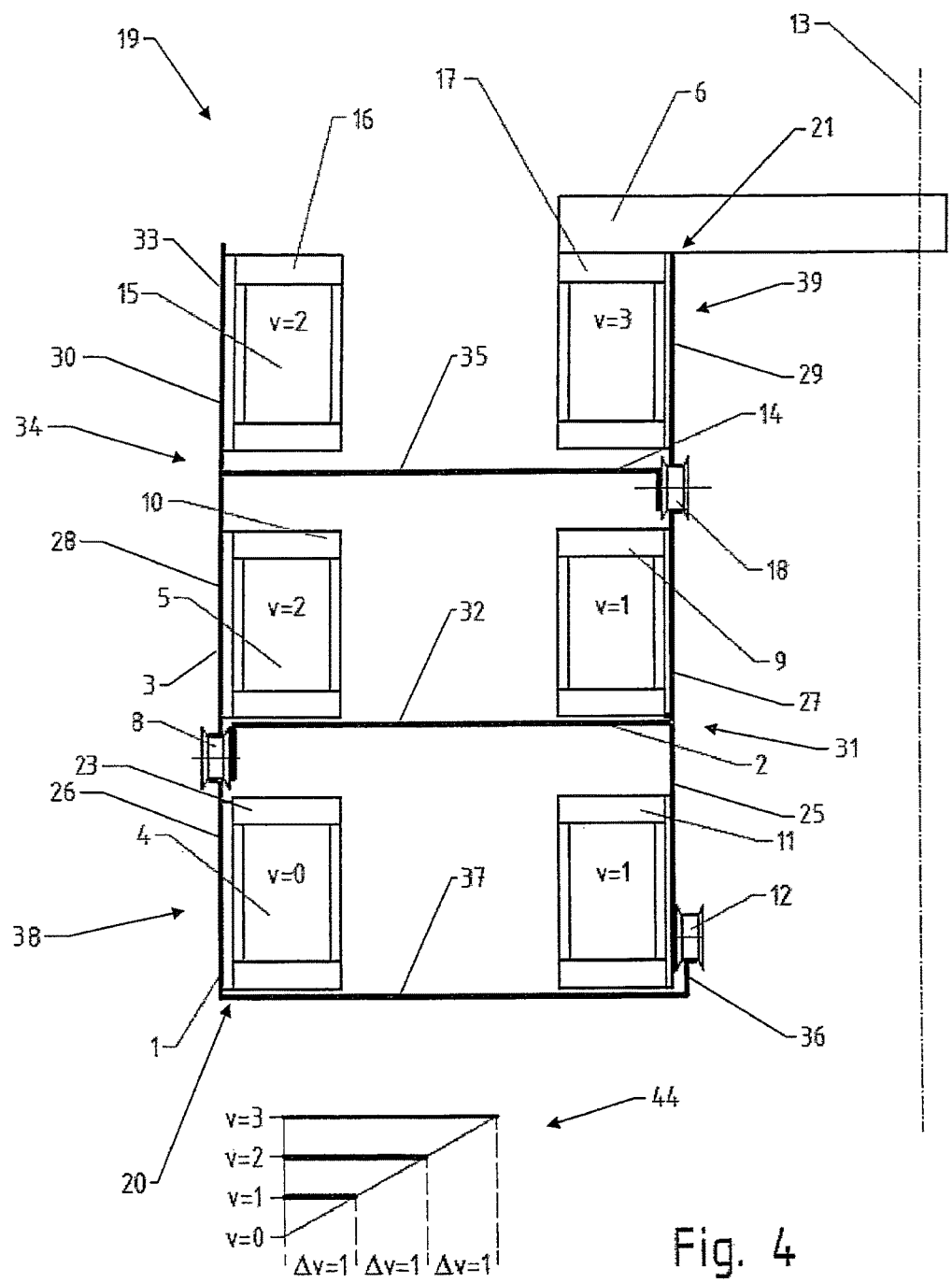
Figure 5:
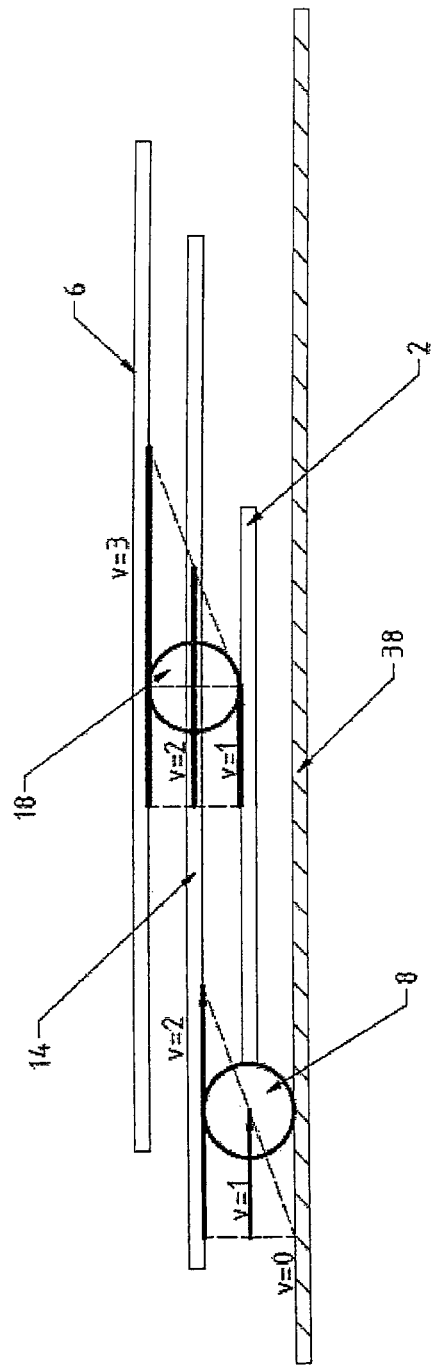
Figure 6:
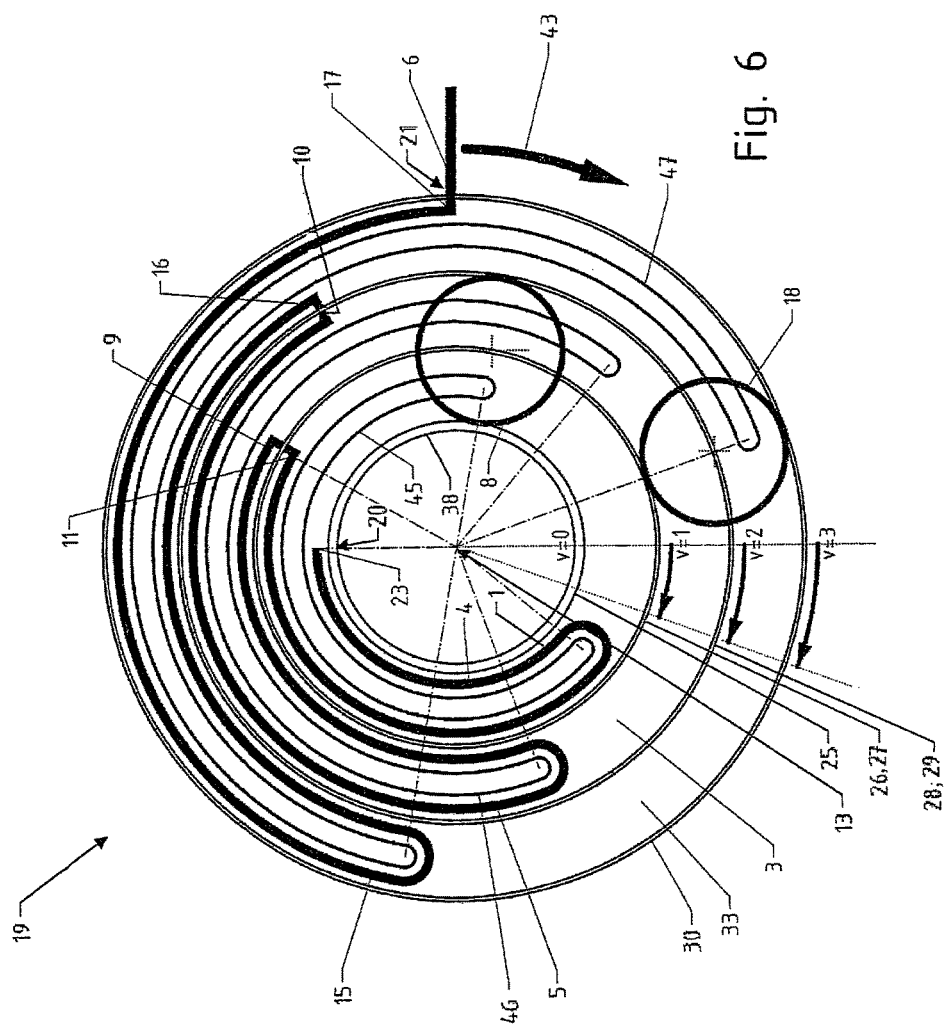
Figure 7:
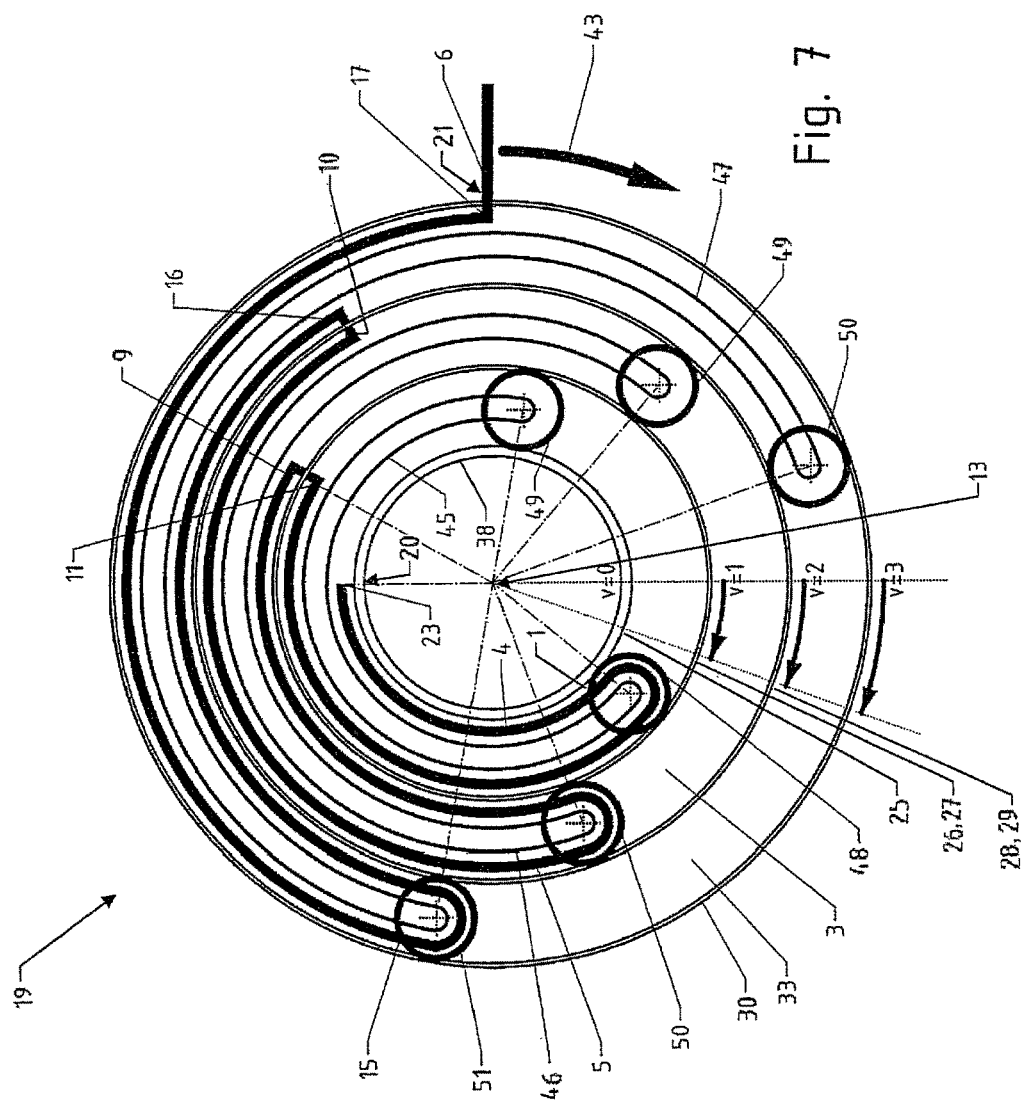
Figure 8:
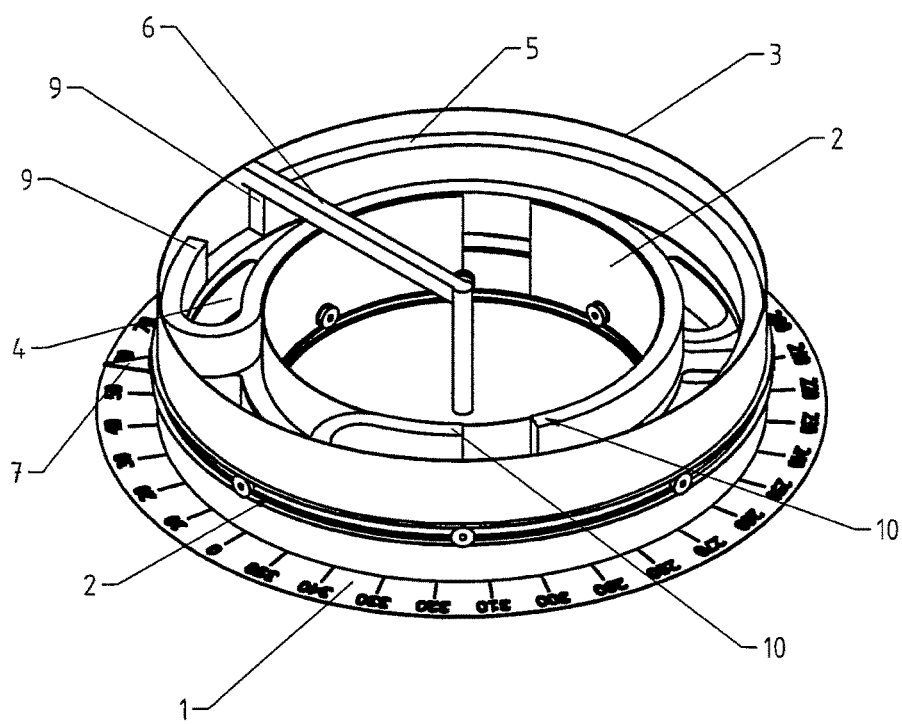

Further advantages and properties of the power conducting device according to the invention will be explained using the exemplary embodiment which is shown in the drawings, without the subject matter of the invention being restricted to said specific exemplary embodiment. In the drawings:

FIG. 1 shows a power conducting device in a plan view, in a zero position,

FIG. 2 shows a power conducting device in a plan view according to FIG. 1, in a position which is deflected by 90°, FIG. 3 shows a detail of a power conducting device in cross section, FIG. 4 shows a power conducting device in section, in a diagrammatic illustration of the speed transmission, FIG. 5 shows a diagrammatic illustration of a developed power conducting device with the absolute speeds, FIG. 6 shows a power conducting device in a plan view, in a flat arrangement, FIG. 7 shows a power conducting device in a plan view, in an alternative flat arrangement, and FIG. 8 shows a power conducting device in a perspective view.

FIG. 1 shows a power conducting device 19 in a plan view, and FIG. 8 shows a power conducting device 19 in a perspective view, with a first guiding channel 1 and a second guiding channel 3. Two line guiding devices 5 with in each case one connecting member 9 which is arranged on the outer ring 28 are in the (upper) second guiding channel 3. Furthermore, the line guiding devices 5 in each case have an end member 10 which is arranged on the inner ring 27. The second line guiding devices 5 and a first line guiding device 4 in the first guiding channel 1 in each case have a second section 24 or first section 22. The first line guiding device is shown concealed for the greatest part and the corresponding designations are mentioned only for the sake of completeness, but some of them cannot be gathered from FIG. 1; reference is made to FIGS. 3 and 4 in this respect. Depending on the position, the sections 24 and 22 bear against the respective inner ring 27 (or 25, not shown) or outer ring 28 (or 26, not shown). In this embodiment, the line guiding devices 4 and 5 are bent only in one plane, namely in the plane of the plan view. The first roller carriage 2 can likewise be seen in FIG. 1, on which first roller carriage 2 the first line guiding device 4 and the second line guiding device 5 are mounted in such a way that both line guiding devices 4, 5 are set in motion at the same time in the case of a movement of the driver arm 6. In this example, the radius 40 of the two inner rings 25 and 27 and the radius 41 of the two outer rings 26 and 28 are in each case identical, the first inner ring 25 and outer ring 26 being concealed in this illustration. In order to illustrate the movement sequences, an angle display 42 is shown in the diagram, in which angle display 42 a position indicator 7 indicates the angle of twist 43 of the roller carriage 2. In FIG. 1, the power conducting device 19 is situated in the starting position, which is indicated by the position indicator 7 and the driver arm 6 with the aid of the angle of twist 43 at zero.

FIG. 2 shows the same construction of a power conducting device 19 as in FIG. 1. Here, however, the driver arm 6 has been twisted by 90°. Here, the position indicator 7 of the first roller carriage 2 has moved only by 45°, that is to say therefore by half the distance. It can likewise be seen in FIG. 2 how the first section 4 and the second section 5 are displaced by way of the twisting, that is to say the conditions of the section between bearing against the inner ring 25, 27 and bearing against the outer ring 26, 28 have changed with the twisting. Because the covered distance in each guiding channel 1, 3 between the end member 11, 10 and the connecting member 23, 9 is identical, the maximum angles of twist are also achieved at the same time on account of the length of the line guiding devices.

FIG. 3 shows a detail of a power conducting device in cross section, as shown, for example, in FIGS. 1 and 2. Here, the lower first guiding channel 1 and the upper second guiding channel 3 are shown, in which the first connecting member 23 is shown in the first guiding channel 1 and the first end member 11 is shown in the first guiding channel 1 and the second connecting member 9 and the second end member 10 are shown in the second guiding channel 3. The end members 11, 10 are fastened to the first roller carriage 2 which has a first roller 8 toward the outside and a third roller 12 toward the inside. The first inner ring 25 and the second inner ring 27 form the first wall 31 of the first roller carriage 2. The first outer ring 26 forms the stationary wall 38 and the second outer ring 28 forms the second wall 34. The first roller 8 is arranged between the second wall 34 and the stationary wall 38. If the second wall 34 is twisted via the driver arm 6, the first roller 8 is driven and rolls on the stationary wall 38. By way of said rolling on the first wall 38, the first roller carriage 2 is likewise set in motion, which first roller carriage 2 can be twisted by means of the third roller 12. Via the first wall 31, the end members 10 and 11 are therefore moved at the same speed, to be precise half the speed, by the driver arm 6 or the second connecting member 9. Here, the first connecting member 23 remains stationary.

FIG. 4 shows one refinement of the power conducting device 19 with three guiding channels 1, 3, 33. The second guiding channel 3 is enclosed by a first bottom 32, the second outer ring 28, a second bottom 35 and the second inner ring 27. The third guiding channel 33 is enclosed by a second bottom 35, a third outer ring 30, a third inner ring 29 and a driver arm 6. Here, a first roller carriage 2 and a second roller carriage 14 are used which have a first roller 8 and a second roller 18, respectively, on their first bottom 32 and on the second bottom 35. The first outer ring 26 forms the stationary wall 38, on which the first connecting member 23 of the first line guiding device 4 is fixed in the first guiding channel 1 at the stationary connecting point 20. The speed of the first connecting member 23 is therefore equal to zero (v=0). The first guiding channel 1 is enclosed by the stationary wall 38, the stationary bottom 37, the first inner ring 25 and the first bottom 32.

Furthermore, a stationary guide 36 is provided on the stationary bottom 37 on the inner ring 25, on which stationary guide 36 the third roller 12 of the first roller carriage 2 can roll. The first roller carriage 2 has a first wall 31 which is composed of the first inner ring 25 and the second inner ring 27. On the first wall 31, the first end member 11 is arranged in the first guiding channel 1 and the second end member 9 is arranged in the second guiding channel 3, with the result that the first end member 11 and the second end member 9 are moved at the same speed (v=1). The second roller carriage 14 has a second wall 34 which is composed of the second outer ring 28 and the third outer ring 30. On the second wall 34, the second connecting member 10 of the second line guiding device 5 is arranged in the second guiding channel 3 and the third connecting member 16 is arranged in the third guiding channel 33 of the line guiding device 5, with the result that the second connecting member 10 and the third connecting member 16 likewise move at the same speed (v=2). Finally, the third roller carriage 39 is formed solely with the third inner ring 29, on which the third end member 17 is arranged and which rotates jointly about the axis 13 via the driver arm 6. The third end member 17 is therefore arranged at the movable connecting point 21. The third end member 17 has a speed (v=3).

If the driver arm 6 is set in motion, the third inner ring 29 rolls on the second roller 18 of the second roller carriage 14. The second roller 18 therefore also rolls on the first wall 31 and the second roller carriage 14 is therefore set in motion. The second wall 34 therefore in turn rolls on the first roller 8 which in turn rolls on the stationary wall 38 and therefore sets the first roller carriage 2 in motion, which first roller carriage 2 rolls via the third roller 12 on the stationary guide 36. The relationship of the speeds is shown in the speed profile 44 of FIG. 4, in which the absolute speed increases in each case by a fixed relative speed (Δv=1). The speed (v=3) of the third end member 17 therefore corresponds to three times the speed (v=1) of the first end member 11 and second end member 9. The speed (v=2) of the third connecting member 16 and second connecting member 10 likewise corresponds to twice the speed (v=1) of the second end member 9 and the first end member 11.

FIG. 5 once again shows the relationships of the speeds of an arrangement, as shown, for example, in FIG. 4. If the driver arm 6 is set in motion at the speed of v=3, the second roller 18 rolls on the first roller carriage 2 at the speed which moves at the speed v=1, and thus drives the second roller carriage 14 at the speed v=2. As a result, the first roller 8 will in turn roll on the stationary wall 38 and therefore move the first roller carriage 2 forward at the speed v=1.

FIG. 6 shows a power conducting device 19 in a flat arrangement, in which the guiding channels 1, 3 and 33 are arranged in one plane next to one another and can move about the common axis 13. Arrangements are also possible which combine the flat arrangement with the above-described arrangement above one another. The power conducting device 19 in FIG. 6 has a first inner ring 25 which forms the stationary wall 38 and on which the first connecting member 23 is arranged which therefore forms the stationary connecting point 20. The first outer ring 26, on which the first end member 11 is arranged, at the same time forms the second inner ring 27, on which the second end member 9 is arranged. This is followed by the second outer ring 28, on which the second connecting member 10 is arranged, and at the same time forms the third inner ring 29, on which in turn the third connecting member 16 is arranged. In this example, the third outer ring 30 is situated on the very outside, on which third outer ring 30 finally the third end member 17 is arranged and is moved via the driver arm 6 and forms the movable connecting point 21. The arrangement of the stationary connecting point 20 and the movable connecting point 21 can also be selected, however, to be exactly the other way around.

In this example of FIG. 6, a movement starting from the driver arm 6 is then distributed uniformly to the rings. The driver arm 6 twists the third outer ring 30 by an angle of twist 43. As a result, the third roller 18 which is fastened to the third inner ring 29 or second outer ring 28 is moved and rolls on the second inner ring 27. As a result, the third inner ring 29 or the second outer ring 28 is set in motion and therefore drives the first roller 8. The first roller 8 is in turn fastened to the second inner ring 27 or the first outer ring 26 and rolls on the stationary wall 38 or the first inner ring 25. As a result, the second inner ring 27 is set in motion, on which in turn the third roller 18 rolls. This therefore results in the same way in a uniform speed distribution as in the case of the arrangement above one another. In order to ensure that the first, second and third line guiding devices 4, 5 and 15 bear against the respective rings, a first intermediate carriage 45, a second intermediate carriage 46 and a third intermediate carriage 47 can be provided, furthermore.

The arrangement in FIG. 7 is in principle the same as in FIG. 6, the intermediate carriages 45, 46 and 47 here forming the fastening points for the paired first transmission rollers 48, second transmission rollers 49 and third transmission rollers 50. Here, the speed distribution is the same as in the previous examples because the intermediate carriages force a movement of the line guiding devices which then transmit it in each case in a halved manner to the opposite ring, in this example from the inside to the outside.

A large angle of twist can be achieved by way of the invention which is shown here, the line guiding devices being mechanically loaded to a minimum extent. The arrangement is also suitable, in particular, for applications, in which jolt-free twisting is to take place because the line guiding devices in the adjacent guiding channels are always set in motion at the same time.

LIST OF DESIGNATIONS

1 First guiding channel
2 First roller carriage
3 Second guiding channel
4 First line guiding device
5 Second line guiding device
6 Driver arm
7 Position indicator
8 First roller
9 Second end member
10 Second connecting member
11 First end member 12 Third roller
13 Axis
14 Second roller carriage
15 Third line guiding device
16 Third connecting member
17 Third end member
18 Third roller
19 Power conducting device
20 Stationary connecting point
21 Movable connecting point
22 First section
23 First connecting member
24 Second section
25 First inner ring
26 First outer ring
27 Second inner ring
28 Second outer ring
29 Third inner ring
30 Third outer ring
31 First wall
32 First bottom
33 Third guiding channel
34 Second wall
35 Second bottom
36 Stationary guide
37 Stationary bottom
38 Stationary wall
39 Third roller carriage
40 Radius of the inner ring
41 Radius of the outer ring
42 Angle display
43 Angle of twist
44 Speed profile
45 First intermediate carriage
46 Second intermediate carriage
47 Third intermediate carriage
48 First transmission roller
49 Second transmission roller
50 Third transmission roller

The invention claimed is:

1. A power conducting device, comprising:
   at least one first line guiding device for guiding lines or hoses between a stationary connecting point and a movable connecting point,
   the first line guiding device having a first end member, a first connecting member and a first section which is connected between the first end member and the first connecting member and is connected to them, which together form a channel for receiving lines or hoses,
   a first guiding channel which is formed by a first inner ring and a first outer ring,
   the first line guiding device being arranged in the first guiding channel, and the first end member being connected to the first inner ring or the first outer ring and the first connecting member being connected to the respectively other first outer ring or first inner ring,
   at least one second guiding channel which is formed by a second inner ring and a second outer ring,
   the first and the second guiding channels being operative to twist relative to one another about a common axis, and
   at least one second line guiding device being arranged in the at least one second guiding channel,
   the second line guiding device having a second end member, a second connecting member and a second section which is connected between the second end member and the second connecting member and is connected to them, which together form a channel for receiving lines or hoses,
   either the first and second connecting members being connected to one another or the first and second end members being connected to one another.

2. The power conducting device as claimed in claim 1, the outer ring or the inner ring of the first guiding channel being stationary.

3. The power conducting device as claimed in claim 1, the guiding channels being arranged above one another.

4. The power conducting device as claimed in claim 1, the guiding channels being arranged next to one another, and the first outer ring of the first guiding channel and the second inner ring of the second guiding channel being formed by a common wall.

5. The power conducting device as claimed in claim 1, wherein the line guiding devices are operative to bend only in one plane.

6. The power conducting device as claimed in claim 1, a connecting member and an end member being arranged above one another in at least one of the guiding channels.

7. The power conducting device as claimed in claim 1, the inner ring and the outer ring of a guiding channel forming lateral walls, and the end members and the connecting members being arranged on the lateral walls.

8. A power conducting device, comprising:
   at least one first line guiding device for guiding lines or hoses between a stationary connecting point and a movable connecting point, the first line guiding device having a first end member, a first connecting member and a first section which is connected between the first end member and the first connecting member and is connected to them, which together form a channel for receiving lines or hoses,
   a first guiding channel which is formed by a first inner ring and a first outer ring,
   the first line guiding device being arranged in the first guiding channel, and the first end member being connected to the first inner ring or the first outer ring and the first connecting member being connected to the respectively other first outer ring or first inner ring,
   at least one second guiding channel which is formed by a second inner ring and a second outer ring,
   the first and the second guiding channels being operative to twist relative to one another about a common axis, and
   at least one second line guiding device being arranged in the at least one second guiding channel,
   the second line guiding device having a second end member, a second connecting member and a second section which is connected between the second end member and the second connecting member and is connected to them, which together form a channel for receiving lines or hoses,
   either the first and second connecting members being connected to one another or the first and second end members being connected to one another, and
   two adjacent inner rings or two adjacent outer rings forming a first wall of a first roller carriage and, furthermore, the first roller carriage having a first bottom, on which a first roller is arranged opposite the first wall.

9. The power conducting device as claimed in claim 8, an adjacent second roller carriage having a second bottom and a second wall which lies opposite the first wall of the first roller carriage, the two adjacent roller carriages enclosing a guiding channel.

10. The power conducting device as claimed in claim 8, the first guiding channel having a stationary guide, a stationary bottom and a stationary wall, the stationary wall forming a support for the first roller.

11. A power conducting device, comprising:
at least one first line guiding device for guiding lines or hoses between a stationary connecting point and a movable connecting point, the first line guiding device having a first end member, a first connecting member and a first section which is connected between the first end member and the first connecting member and is connected to them, which together form a channel for receiving lines or hoses,
a first guiding channel which is formed by a first inner ring and a first outer ring,
the first line guiding device being arranged in the first guiding channel, and the first end member being connected to the first inner ring or the first outer ring and the first connecting member being connected to the respectively other first outer ring or first inner ring,
at least one second guiding channel which is formed by a second inner ring and a second outer ring,
the first and the second guiding channels being operative to twist relative to one another about a common axis, and
at least one second line guiding device being arranged in the at least one second guiding channel,
the second line guiding device having a second end member, a second connecting member and a second section which is connected between the second end member and the second connecting member and is connected to them, which together form a channel for receiving lines or hoses,
either the first and second connecting members being connected to one another or the first and second end members being connected to one another, and
at least three guiding channels which are arranged above one another being provided, in which in each case at least one line guiding device is arranged.

12. The power conducting device as claimed in claim 11, the first wall of the first roller carriage having a third roller toward the stationary guide, which third roller rolls on the stationary guide, and a second roller being arranged between a roller carriage, arranged thereon, and the first roller carriage.

13. The power conducting device as claimed in claim 12, the second roller being arranged on the second roller carriage.

14. A power conducting device, comprising:
at least one first line guiding device for guiding lines or hoses between a stationary connecting point and a movable connecting point, the first line guiding device having a first end member, a first connecting member and a first section which is connected between the first end member and the first connecting member and is connected to them, which together form a channel for receiving lines or hoses,
a first guiding channel which is formed by a first inner ring and a first outer ring,
the first line guiding device being arranged in the first guiding channel, and the first end member being connected to the first inner ring or the first outer ring and the first connecting member being connected to the respectively other first outer ring or first inner ring,
at least one second guiding channel which is formed by a second inner ring and a second outer ring,
the first and the second guiding channels being operative to twist relative to one another about a common axis, and
at least one second line guiding device being arranged in the at least one second guiding channel,
the second line guiding device having a second end member, a second connecting member and a second section which is connected between the second end member and the second connecting member and is connected to them, which together form a channel for receiving lines or hoses,
either the first and second connecting members being connected to one another or the first and second end members being connected to one another, and
a guiding channel forming a bottom and a wall which is connected to the bottom, and a roller being arranged on the bottom opposite the wall, the roller rolling on a wall which is arranged underneath, and a wall which is arranged above rolling on the roller.

15. The power conducting device as claimed in claim 14, the radius of the inner rings and/or the radius of the outer rings of the different guiding channels being in each case identical.

16. A power conducting device, comprising:
at least one first line guiding device for guiding lines or hoses between a stationary connecting point and a movable connecting point,
the first line guiding device having a first end member, a first connecting member and a first section which is connected between the first end member and the first connecting member and is connected to them, which together form a channel for receiving lines or hoses,
a first guiding channel which is formed by a first inner ring and a first outer ring,
the first line guiding device being arranged in the first guiding channel, and the first end member being connected to the first inner ring or the first outer ring and the first connecting member being connected to the respectively other first outer ring or first inner ring,
at least one second guiding channel which is formed by a second inner ring and a second outer ring,
the first and the second guiding channels being operative to twist relative to one another about a common axis, and
at least one second line guiding device being arranged in the at least one second guiding channel,
the second line guiding device having a second end member, a second connecting member and a second section which is connected between the second end member and the second connecting member and is connected to them, which together form a channel for receiving lines or hoses,
either the first and second connecting members being connected to one another or the first and second end members being connected to one another, and
rollers being provided between the guiding channels, and at least one of the rollers forming a speed step-up transmission means for adjacent guiding channels.

17. A power conducting device, comprising:
at least one first line guiding device for guiding lines or hoses between a stationary connecting point and a movable connecting point, the first line guiding device having a first end member, a first connecting member and a first section which is connected between the first end member and the first connecting member and is connected to them, which together form a channel for receiving lines or hoses,
a first guiding channel which is formed by a first inner ring and a first outer ring,
the first line guiding device being arranged in the first guiding channel, and the first end member being connected to the first inner ring or the first outer ring and the first connecting member being connected to the respectively other first outer ring or first inner ring,
at least one second guiding channel which is formed by a second inner ring and a second outer ring,
the first and the second guiding channels being operative to twist relative to one another about a common axis, and
at least one second line guiding device being arranged in the at least one second guiding channel,
the second line guiding device having a second end member, a second connecting member and a second section which is connected between the second end member and the second connecting member and is connected to them, which together form a channel for receiving lines or hoses,
either the first and second connecting members being connected to one another or the first and second end members being connected to one another, and
in each case one intermediate carriage being provided in at least one guiding channel, which intermediate carriage acts on the section of the respective line guiding device, and to which intermediate carriage in each case at least one roller is fastened which rolls on the respective inner ring and the respective outer ring.

\* \* \* \* \*